United States Patent
Skalski et al.

(10) Patent No.: US 9,832,138 B1
(45) Date of Patent: Nov. 28, 2017

(54) METHOD FOR AUTOMATIC MANAGEMENT CAPACITY AND PLACEMENT FOR GLOBAL SERVICES

(71) Applicant: GOOGLE INC., Mountain View, CA (US)

(72) Inventors: Kamil Skalski, Bydgoszcz (PL); Elzbieta Czajka, Warsaw (PL); Filip Grzadkowski, Warsaw (PL); Krzysztof Grygiel, Warsaw (PL)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 14/688,689

(22) Filed: Apr. 16, 2015

Related U.S. Application Data

(60) Provisional application No. 61/980,486, filed on Apr. 16, 2014.

(51) Int. Cl.
    G06F 15/173    (2006.01)
    H04L 12/911    (2013.01)
    H04L 12/803    (2013.01)
    H04L 29/08     (2006.01)
    G06F 9/50      (2006.01)

(52) U.S. Cl.
    CPC .......... *H04L 47/783* (2013.01); *H04L 47/125* (2013.01); *G06F 9/5083* (2013.01); *H04L 67/1002* (2013.01)

(58) Field of Classification Search
    CPC ....... H04L 47/783; H04L 47/125; H04L 1/22; H04L 47/781; H04L 47/782; H04L 47/828; H04L 47/726; H04L 47/728; H04L 47/788; H04L 47/821; H04L 47/822; H04L 47/823; G06F 11/08
    See application file for complete search history.

(56) References Cited

U.S. PATENT DOCUMENTS

| | | | |
|---|---|---|---|
| 6,463,454 B1 * | 10/2002 | Lumelsky | G06F 9/5083 707/E17.12 |
| 2009/0222573 A1 * | 9/2009 | Grossner | H04L 47/10 709/235 |
| 2010/0100696 A1 * | 4/2010 | Suzuki | G06F 3/0625 711/162 |

OTHER PUBLICATIONS

Qiu L, Padmanabhan V, Voelker G, On the placement of web server replicas, 2001, INFOCOM 2001. Twentieth Annual Joint Conference of the IEEE Computer and Communications Societies. Proceedings. IEEE.*

* cited by examiner

*Primary Examiner* — Hieu Hoang
(74) *Attorney, Agent, or Firm* — Lerner, David, Littenberg, Krumholz & Mentlik, LLP

(57) ABSTRACT

Systems and methods for providing web service instances to support traffic demands for a particular web service in a large-scale distributed system are disclosed. An example method includes determining a peak historical service load for the web service. The service load capacity for each existing web service instance may then be determined. The example method may then calculate the remaining service load after subtracting the sum of the service load capacity of the existing web service instances from the peak historical service load for the web service. The number of web service instances necessary in the large-scale distributed system may be determined based on the remaining service load. The locations of the web service instances may be determined and changes may be applied to the large-scale system based on the number of web service instances necessary in the large-scale distributed system.

11 Claims, 6 Drawing Sheets

METHOD FOR AUTOMATIC MANAGEMENT CAPACITY AND PLACEMENT FOR GLOBAL SERVICES

PRIORITY STATEMENT

This non-provisional application claims the benefit of U.S. Provisional Application No. 61/980,486 filed Apr. 16, 2014. The entire contents of the above application are hereby incorporated by reference.

BACKGROUND

In recent years, software engineers have focused on building global-scale Internet applications. These applications include web services that provide users with access to data and functionality such as maps, email, news, and social networking information. Web service providers often provide application programming interfaces (APIs) so that software developers can have controlled access to methods and data from web services.

For example, a web service provider may create a mapping service and provide a Map API for software developers to access the mapping service's functionality. The Map API may contain information about the mapping service including methods to obtain: directions to a location, the travel distance between locations, the travel time between locations, and a location's elevation. If a software developer is building an application for a fast food restaurant, the developer may want to use the Map API to allow a user to request directions to the restaurant from the user's current location. The developer does not have to write the map-specific code to obtain directions, but can instead use the Map API to access the mapping web service's functionality and obtain directions.

Individual web services may handle global user traffic of varying quantities and from various sources depending on the data and functionality that each web service provides and the number of applications that access the web service. In order to support global user traffic and respond quickly to user requests, multiple instances of a particular web service may need to be running on computing devices in multiple datacenters that exist in several locations. An example datacenter is illustrated in FIG. 5.

As shown in FIG. 1, large-scale distributed systems may provide web services and allow multiple applications, users, or computing devices to access the web services. The distributed system may use a client/server architecture in which one or more central servers store services and provide data access to network clients.

FIG. 2 illustrates a block diagram of an exemplary distributed system 200 for providing data in a large-scale distributed system. The system 200 includes a plurality of user terminals 202 (e.g. 202-1 . . . 202-n), each of which includes one or more applications 204 (e.g. 204-1 . . . 204-n), such as an Internet browser. The user terminals 202 are connected to a server 206 and a plurality of computer clusters 210 (e.g., 210-1 . . . 210-m) through a network 208 such as the Internet, a local area network (LAN), a wide area network (WAN), a wireless network, or a combination of networks. The server 206 may include one or more memory devices 214, and one or more CPUs 216. There may be global load balancing, which routes requests to particular datacenters, from a load balancing engine 212.

Each of the user terminals 202 may be a computer or similar device through which a user can submit requests to and receive results or services from the server 206. Examples of the user terminals 202 include, without limitation, desktop computers, notebook computers, tablets, mobile devices such as mobile phones, smartphones, personal digital assistants, set-top boxes, or any combination of such devices.

In order to support global-scale access to web services, a conventional technique is to create more than one instance of a particular web service. Having multiple instances allows copies of a web service to be stored in more than one datacenter by maintaining copies (or instances) of the same web service so that the web service can tolerate datacenter failures. If a datacenter that contains a particular web service instance is unavailable, the web service can be accessed from other instances stored or located at alternate datacenters.

Determining the number of web service instances, the locations of the instances, and the capacity required at each location requires complex planning and system administration work. These determinations must take into consideration various constraints on web service instance placement in order to ensure good quality of service for all users trying to access a particular web service. Example constraints include: the number of users of a web service in specific locations, the number of web service requests and computational resources required for handling the requests, internal dependencies of a web service on other systems, the locations and capacities of datacenters in which the web services are executing, failure rates of infrastructure in the datacenters, the network latency/bandwidth/quality among datacenters or datacenters and end users, and the speed and ease of deploying new versions of web services. Web service instance placement and capacity in a particular location are also subject to cost optimization, where marginally better quality of service is often traded for less expensive placements.

Decisions regarding the number of web service instances and web service instance placement for a particular web service are customarily decided manually for each web service. This process can be time-consuming and prone to errors. Additionally, the process does not change dynamically when a data center goes down, or when internal or external dependencies change or move. Therefore, as recognized by the inventors, there should be an automated process that determines the placement of web service instances and the capacity of each web service instance to improve the quality of service for users while minimizing the cost of running the web services.

DETAILED DESCRIPTION

According to an exemplary embodiment, there may be a method for automatically managing the number, placement, and capacity of web service instances. An exemplary method may include two steps: (1) allocating a number of instances required for a particular web service based on the number of user requests and (2) choosing preferred locations for the instances that have been allocated for the web service.

In some embodiments, it may be assumed that all requests for a particular web service will be handled by a single instance of the web service from a single location. An additional web service instance may be added as a back-up instance in case the primary instance is unavailable due to hardware, system, or some other failure. One other instance of the web service may be added to enable maintenance to be performed on a datacenter. When maintenance is performed on a datacenter, traffic from the location under maintenance must be diverted to other locations. In an exemplary embodiment, three instances of a particular web service are provided at various locations within datacenters in a large-scale distributed system.

Generally, a problem for automatically managing web service instances may begin with three instances as discussed above. An exemplary method may increase web service instances and other resources as real traffic flows into the existing web service instances. An external system may be used to initially adjust resources and web service instance numbers as more tasks are assigned to web service instances. The exemplary method may determine the traffic expected for a given web service in order to anticipate the number of web service instances needed to handle the traffic.

Figure 1:
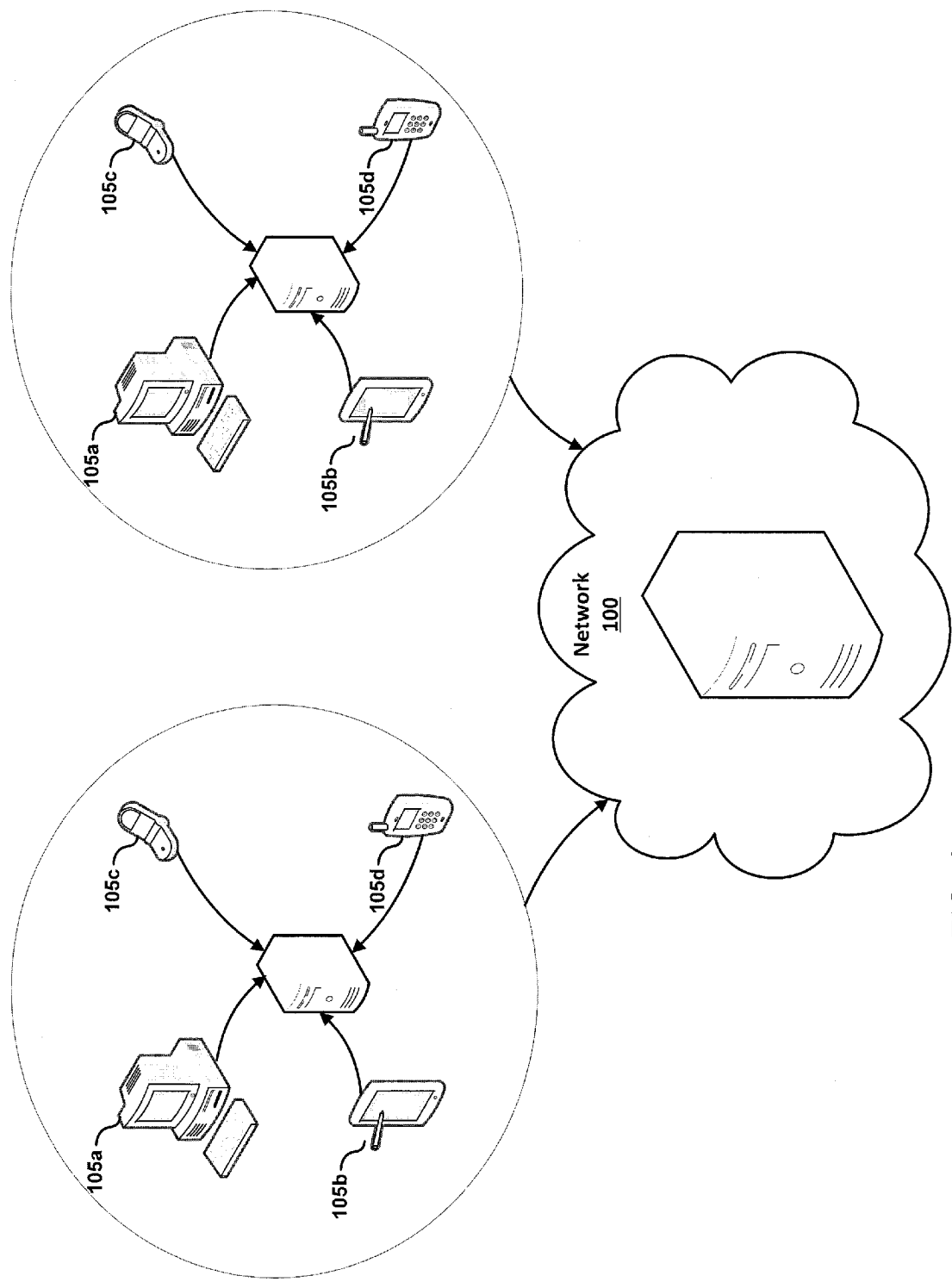
FIG. 1 is a block diagram illustrating an exemplary configuration of a large-scale distributed system.
Figure 2:
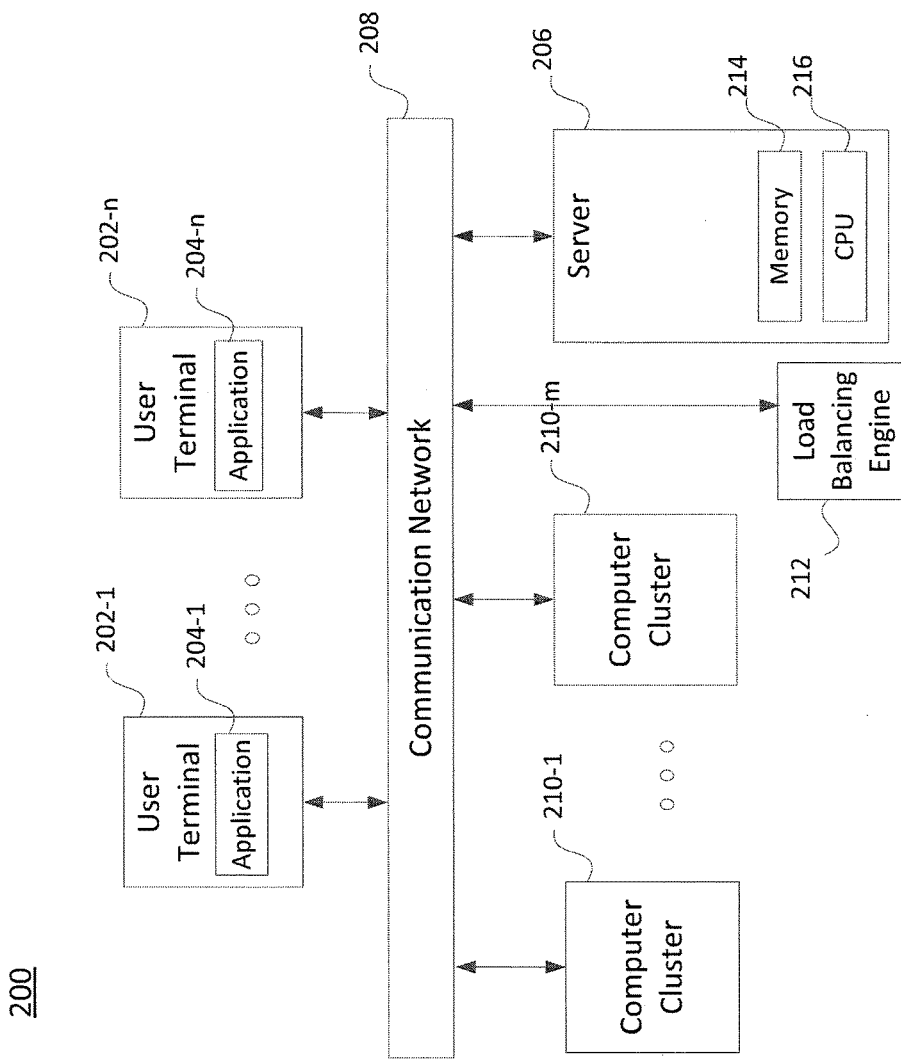
FIG. 2 is a block diagram illustrating an exemplary system for implementing resource allocation in distributed systems.
Figure 3:
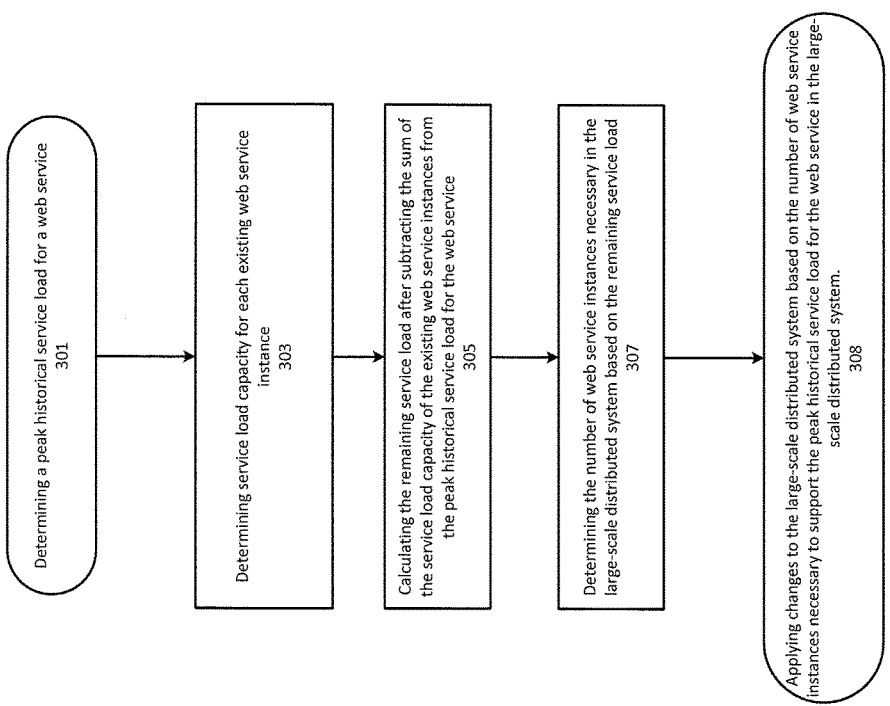
FIG. 3 is a flow diagram of an exemplary method for providing web service instances to support traffic demands for a particular web service in a large-scale distributed system.

An example method for determining the number of web service instances necessary to handle expected traffic for a particular web service may begin with determining the service load capacity for each existing web service instance as illustrated in FIG. 3 (303). Service load capacity may be determined by the queries per second capacity of datacenter cells on which existing web service instances exist. In some embodiments weighted queries per second may be used. Different queries may have different "costs" or "weight" on the server side. For example, some queries may need more CPU than others or query more backends than others. Each datacenter cell may have a maximum number of queries that the cell can handle at a given time. The example method may then look at historical data regarding traffic for the web service. A peak historical service load for the web service may be determined (301). Service load may be calculated by using peak queries per second on the web service. For example, the method may use the last seven days of web service traffic to estimate the number of queries a web service should be able to handle at a given time. If historical data does not exist for the particular web service, a web service may not be scaled, but instead may be executed on three instances within a large-scale distributed system. However, historical data of another existing, large service may be used to choose the primary location for a new service.

If historical data exists for a web service, an example method may determine the average distribution of traffic for the web service. The number of datacenter cells required to support expected web service requests may be determined by calculating the service load capacity provided by existing datacenter cells running web service instances and subtracting the total capacity for existing web service instances from the capacity needed to support the historical service load (305, 307). In some embodiments, placement for N (the determined number of web service instances) plus a few extra web instances may be calculated. An example system may want to provide N web service instances even if some datacenter clusters may fail or have scheduled maintenance.

An example system may determine where the web service instances should be stored and where, if necessary, extra ones should be placed in case of outages. The extra web service instances may be determined to be the smallest possible set of web service instances necessary to guarantee N available web service instance at all times.

Additionally, datacenter cells may be divided into groups. During a set time period cells from one group may be unavailable due to maintenance events. Cells from a particular group may be unavailable for up to the specified time period. An example system may have to be prepared for the unavailability of datacenter cells in one group for planned maintenance as well as an unexpected failure in a cell from a different group. The exemplary system may then add more web service instances to be placed in additional datacenter cells if more cells running the web service instances are required to support the web service traffic. The exemplary method may assume new cells can provide median service load capacity based on the service load capacity provided by existing cells running web service instances. If the expected web traffic is lower than the capacity that can be provided by the existing web service instances, web service instances may be removed from cells. Changes to the large-scale distributed system may be applied by deploying additional web service instances or by shutting down web service instances on selected cells depending on web service traffic and whether web service instances need to be added or removed from the large-scale distributed system (308). Periodically, instance placement decisions are reevaluated. A reevaluation may include computing web service instance numbers and web service instance placement without regard to current web service instance numbers or placement. Each time may be calculated like the first time. This reevaluation may occur on a regular basis such as per week, per day, or per hour. In some embodiments, evaluations may be done at any time.

An example system may not move existing instances to other locations unless necessary. If web traffic becomes much lower for a particular web service than previously observed, a new smaller set of locations may be chosen for the given service. Additionally, unneeded instance may be removed. This process of determining the number of a particular web service's instances may continue as long as there are free resources in an existing location or a quota limit has been reached. An example system may execute a given amount of time, a week for example, before a web service's configuration is reevaluated. Reconfiguring a web service's instances may happen automatically or may be initiated by each service owner like a service update.

In some embodiments, an example system may track how many resources are needed to serve each query from a traffic source and model the traffic assignment so that the system understands how many new cells are needed to support the traffic source and how many queries per second will be provided by each existing cell and each new cell To model the traffic assignment, an example system may assume that load balancing systems will choose the instance closest to the user up to the instance's capacity. The system also may assume that traffic is not assigned across continents. An example system may observe the relationship between the amount of incoming traffic and resource usage. Based on this relationship, the system may compute a linear function from incoming traffic to required resources. The linear function may be used in two ways: (1) to compute the amount of currently needed resources based on incoming traffic and (2) to predict the number of queries per second, which could be served with all available resources.

In some embodiments, instead of scaling the resources linearly, an example system may construct a distribution of usage at given queries per second and then scale the distribution to the expected traffic by computing an n-fold convolution power of the distribution. An example system may downsample the stream of usage samples by averaging the usage over longer time intervals. The usage measured at actual_load may be downsampled with the ratio equal to (expected_load/actual_load). This sampling may provide a prediction of usage at expected_load. For example, an example system may measure usage at one query per second and the system may want to predict the usage at ten queries per second. In order to accurately predict the usage, the example system may take the total usage over a ten second interval and use it as a one second usage sample. The percentiles of the distribution obtained this way may scale properly. However, in some embodiments, the case with constant usage (i.e. background computations independent from traffic) requires slightly more caution since a system does not want to scale the constant part by the expected load.

In an exemplary system, the number of a particular web service's instances may be placed in datacenter cells to minimize the delay due to network distance between a computer originating a web service request and a computer running the web service instance. Furthermore, locations for web service instances may be selected to minimize overall large-scale distributed system latency. Overall latency may be affected by the distance an instance is from a user. Latency may also be affected by service dependencies (such as databases). In some embodiments, instances may be placed closer to users. In other embodiments, instances may be placed closer to service dependencies. Instances may also be placed in between users and service dependencies.

Figure 4:
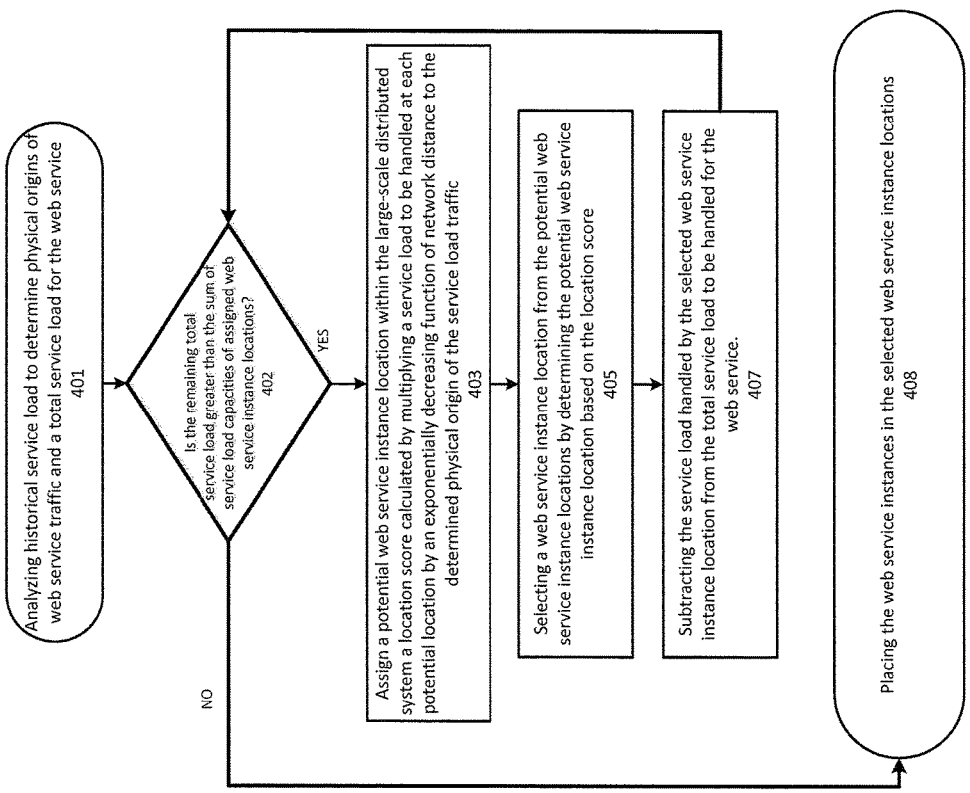
FIG. 4 is a flow diagram of an exemplary method for determining the locations of web service instances for a particular web service in a large-scale distributed system
Figure 5:
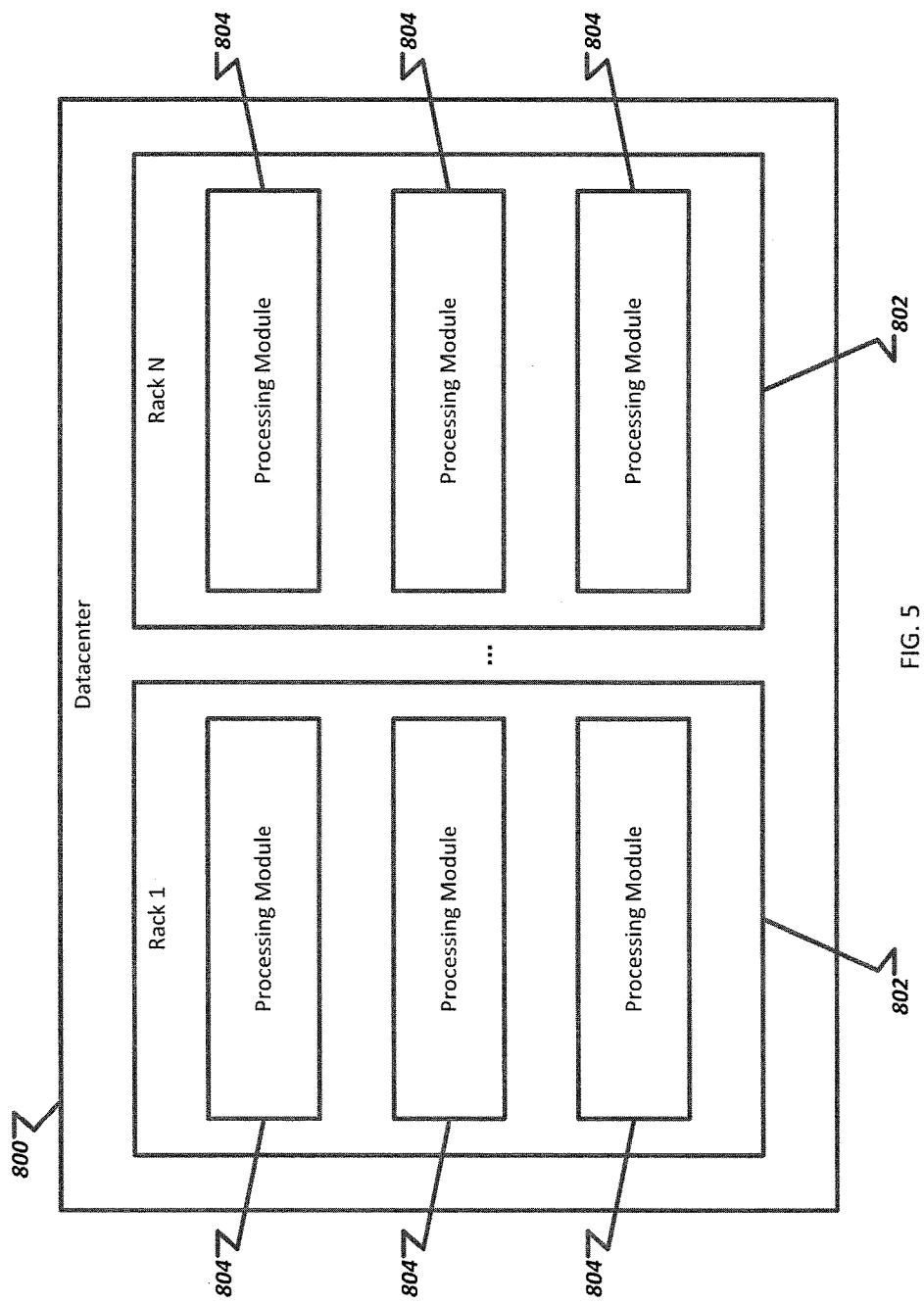
FIG. 5 is an example datacenter

An example method for choosing web service instance locations begins by analyzing historical service load for a web service to determine physical origins of web service traffic and the total service load for the web service as illustrated in FIG. 4 (401) Each potential location within the large-scale distributed system may be assigned a location score calculated by multiplying the service load of a web instance running at the location, such as the number of queries that may be handled by the location, by an exponentially decreasing function of network distances to the determined physical origin of the service load traffic (403) For each potential location and each traffic source, and example method may compute the following function: $1-\tanh[(x/40)^{2.5}]$. In this equation x is the network distance in milliseconds between locations and the traffic source. The location score may be scaled by the percentage of global traffic which comes from this source. A final score for a potential location may be the sum of scores for traffic sources that can be handled by the location. The location may be selected based on the location scores of potential locations (405). For example, the location with the largest score may be selected first and subsequent locations may be chosen in score order to place the determined number of web service instances. However, an example system may try to minimize the number of datacenter clusters by choosing a datacenter with a lower score, but that will increase the number of different failure domains represented by the web service instance locations.

In some embodiments, users may specify how close the service should be to the users by providing round trip time of a query between two places. If round trip time is specified, only user traffic from locations within round trip time distance from a web service instance location may be subtracted from the web service instance location's capacity. An example system may only take into account traffic from the same continent. The system may assume that a chosen datacenter cell will handle less traffic than it has capacity to handle. The service load handled by the selected web service instance locations may be subtracted from the total service load to be handled for the web service based on the historical traffic (407). This process may be repeated until the entire service load expected for the web service can be handled by web service instances with assigned locations (402,408). There may be additional checks including: whether the global load is already covered, whether all the incoming traffic is coming from users within a round-trip-time specified by the user, and whether N+k (required number of web service instances plus a small set of web service instances in case of failures or unavailability) redundancy is available in the system. The process may assign more locations than the number of web service instances initially determined based on capacity needs.

An example method may stop creating instances when there is enough capacity and all or most web service traffic is assigned to datacenters. A location score may be computed for potential locations for storing web service instances and locations may be chosen for web service instances based on details such as high location score (where a high score may be 90%) and/or the location increases diversity across datacenter groups.

Additional constraints and score modifiers may be used to select locations. For example, if a web service has a dependency, such as a storage dependency, or the web service requires another service to run, the web service instance may be required to be within a short network distance from a location of the dependency. An example system may use "round trip latency" to specify a short network distance. This round trip latency may be different for each web service and may be specified by the service owner. A system may additionally or alternatively prefer locations from which the web service instances are currently being run to decrease migration costs.

In some embodiments, an owner of a web service may specify the maximum desired network distance between computing devices where web service request traffic originates and computing locations of the web service instances. Datacenters with more free resources may be preferred over those datacenters with fewer resources.

An example system may specify constraints on the maximum distance and/or round trip latency from traffic source locations to the nearest web service instance. Given this constraint, the number of web service instances may need to be increased. To satisfy a given constraint, an example system may find the distribution of traffic during daily regional peaks sampled from a given period of traffic volume information. An array of source cells with their traffic volume may be created. An array of candidate datacenter cells for fulfilling the source cell requirements may be created. An example system may calculate an approximation of how much traffic volume a single selected backend datacenter cell can handle by computing the total traffic volume divided by the number of required datacenter cells. Then datacenter cell's may be selected based on their score which may be assigned by a scoring algorithm. The selection of cells may continue until the sum of the capacity for all selected cells is greater than or equal to the total traffic volume and all sources have their traffic handled.

The selection process may be optimized to find a minimal set of clusters that satisfies the constraints on the system. A minimum edge cost flow algorithm may be used to determine datacenter clusters. Using the algorithm, a bipartite graph may be created with traffic sources on the left side and backend candidates on the right side. The sources and backend candidates may be joined with edges of particular max-RTT.

Figure 6:
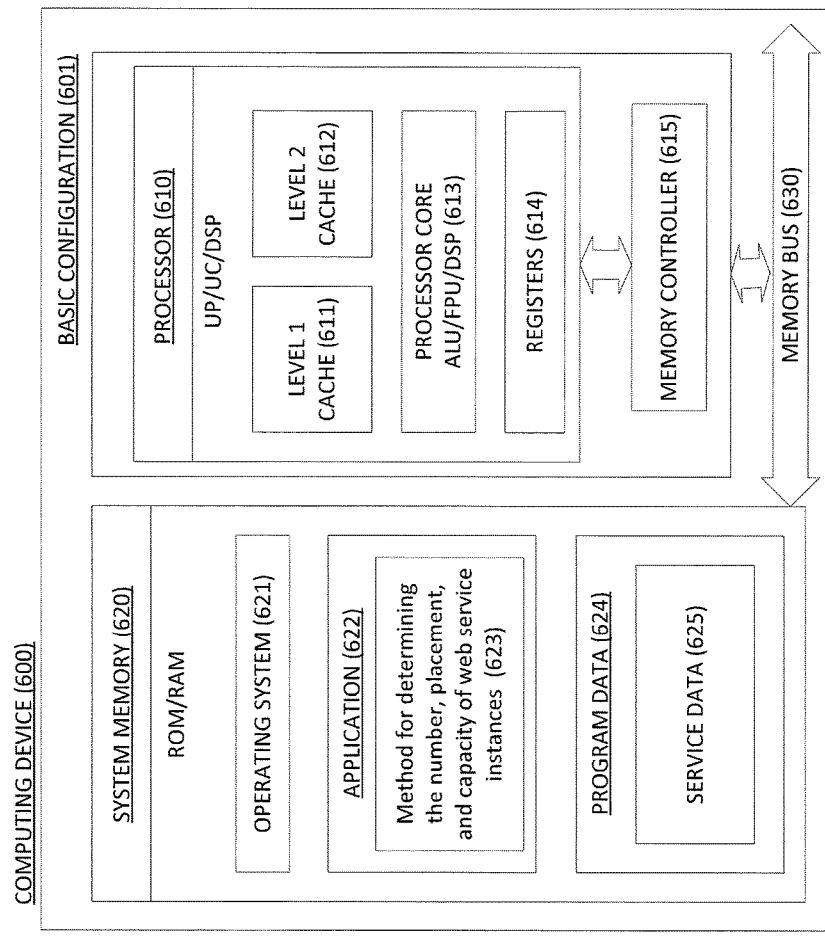
FIG. 6 is a block diagram illustrating an exemplary computing device.

FIG. 6 is a high-level block diagram of an example computer (600) that is arranged for determining the number and placement of web service instances in a large-scale distributed system. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (μP), a microcontroller (μC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method for determining the number, placement, and/or capacity of web service instances in a large-scale distributed system. Program Data (624) includes storing instructions that, when executed by the one or more processing devices, implement a method for determining the number and placement of web service instances for a particular web service. (623). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for providing web service instances to support traffic demands for a particular web service in a large-scale distributed system, the method comprising:
   determining a peak historical service load for the web service;
   determining service load capacity for each existing web service instance;
   determining a sum of the service load capacities of the existing web service instances;
   calculating a remaining service load after subtracting the sum of the service load capacities of the existing web service instances from the peak historical service load for the web service;
   determining a number of additional web service instances based on the remaining service load;

determining locations for the additional web service instances; and creating the additional web service instances at the determined locations of the large-scale distributed system.

2. The computer-implemented method of claim 1, wherein the peak historical service load includes queries per second.

3. The computer-implemented method of claim 1, wherein creating the additional web service instances further comprises creating the additional web services instances to accommodate the remaining service load when the remaining service load is greater than zero.

4. The computer-implemented method of claim 1 further comprising removing web service instances to remove excess service load capacity when the remaining service load is less than zero.

5. The computer-implemented method of claim 4 further comprising shutting down the number of web service instances to be removed from the large-scale distributed system.

6. A computer-implemented method for determining locations of web service instances for a particular web service in a large-scale distributed system, the method comprising:

analyzing historical service load to determine physical origins of web service traffic and a total service load for the web service, wherein the web service is provided from assigned web service instance locations, each assigned web service instance location having a service load capacity;

determining a sum of the service load capacities of the assigned web service instance locations;

determining whether a remaining total service load to be assigned to a web service instance location is greater than the sum of the existing service load capacities of the assigned web service instance locations; and when a remaining total service load to be assigned to a web service instance location is greater than the sum of the existing service load capacities of the assigned web service instance locations:

assigning a potential web service instance location within the large-scale distributed system a location score calculated by multiplying a service load to be handled at each potential location by a decreasing function of network distance to the determined physical origin of service load traffic;

selecting a web service instance location from the potential web service instance locations by determining the potential web service instance location based on the location score; and subtracting the service load handled by the selected web service instance location from the total service load to be handled for the web service; and creating the web service instances in the selected web service instance locations.

7. A system for providing web service instances to support traffic demands for a particular web service in a large-scale distributed system, the system comprising:

one or more processing devices and one or more storage devices storing instructions that, when executed by the one or more processing devices cause the one or more processing devices to:

determine a peak historical service load for the web service;

determine a service load capacity for each existing web service instance;

determine a sum of the service load capacities of the existing web service instances;

calculate a remaining service load after subtracting the sum of the service load capacities of the existing web service instances from the peak historical service load for the web service;

determine a number of additional web service instances based on the remaining service load;

determine locations for the additional web service instances; and create the additional web service instances at the determined locations of the large-scale distributed system.

8. The system of claim 7, wherein the peak historical service load includes queries per second.

9. The system of claim 7, wherein creating the additional web service instances further comprises creating the additional web service instances to accommodate the remaining service load when the remaining service load is greater than zero.

10. The system of claim 7 further comprising removing web service instances to remove excess service load capacity when the remaining service load is less than zero.

11. The system of claim 10 further comprising shutting down the number of web service instances to be removed from the large-scale distributed system.

* * * * *

UNITED STATES PATENT AND TRADEMARK OFFICE
CERTIFICATE OF CORRECTION

| | | |
|---|---|---|
| PATENT NO. | : 9,832,138 B1 | Page 1 of 1 |
| APPLICATION NO. | : 14/688689 | |
| DATED | : November 28, 2017 | |
| INVENTOR(S) | : Kamil Skalski et al. | |

It is certified that error appears in the above-identified patent and that said Letters Patent is hereby corrected as shown below:

On the Title Page

Item (54) and in the Specification at Column 1, Lines 1-3 Title: "METHOD FOR AUTOMATIC MANAGEMENT CAPACITY AND PLACEMENT FOR GLOBAL SERVICES" should read -- METHOD FOR AUTOMATIC MANAGEMENT OF CAPACITY AND PLACEMENT FOR GLOBAL SERVICES --

Signed and Sealed this
Thirteenth Day of February, 2018

Andrei Iancu
*Director of the United States Patent and Trademark Office*